April 13, 1954     M. J. KING     2,675,243
MONOWHEEL ROLLER SKATE
Filed Aug. 20, 1951     5 Sheets-Sheet 1
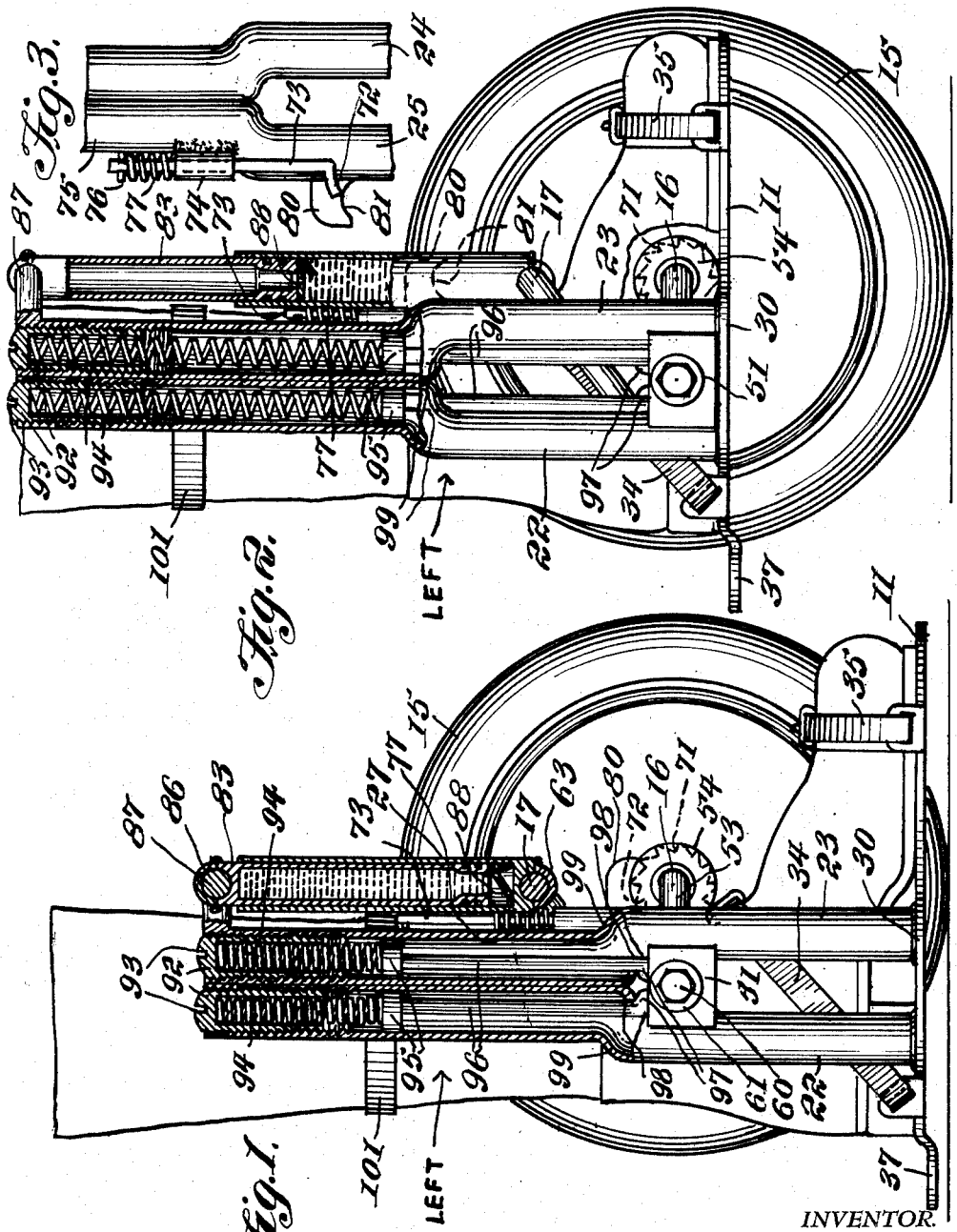
INVENTOR.
Mike J. King,
BY Victor J. Evans & Co.
ATTORNEYS

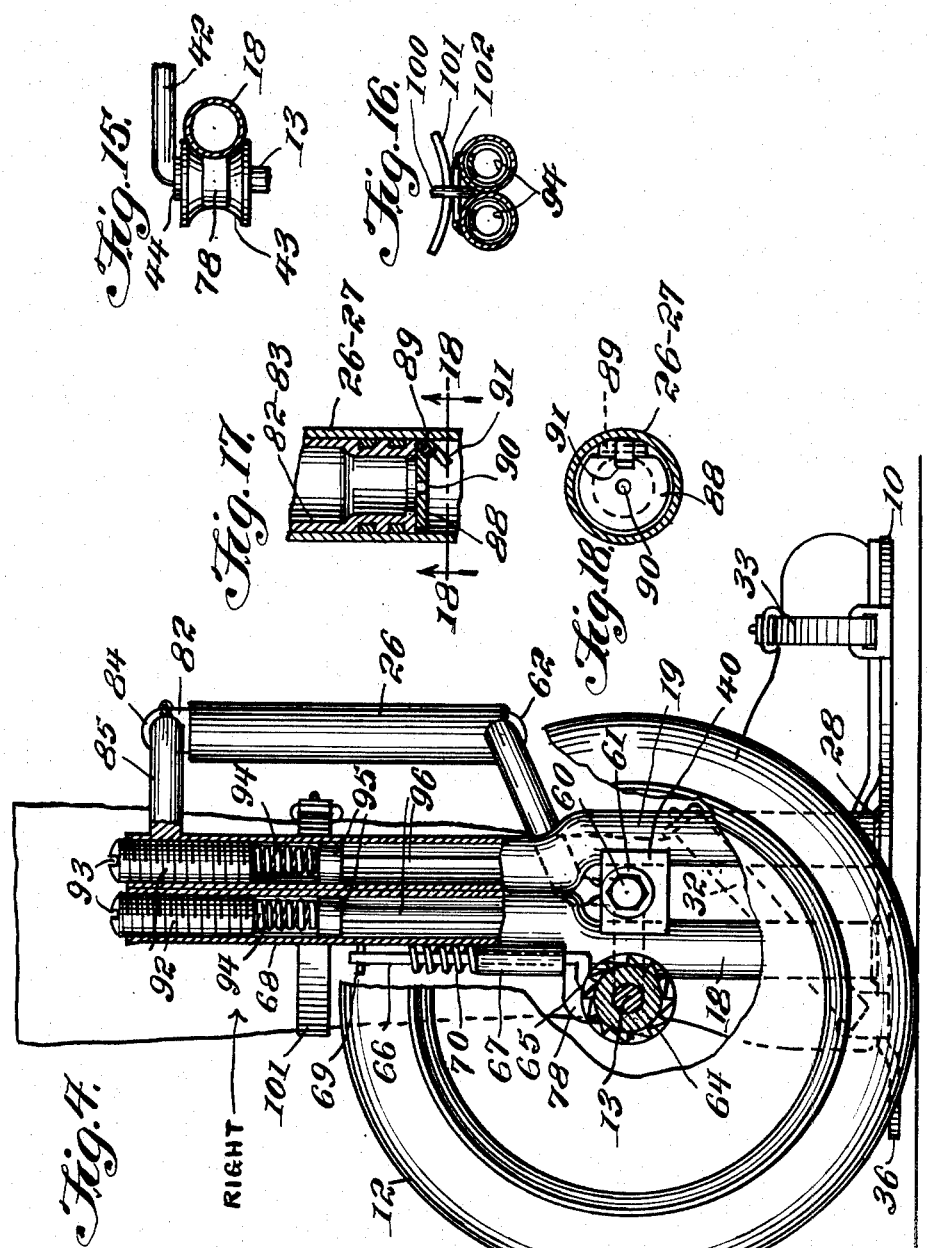

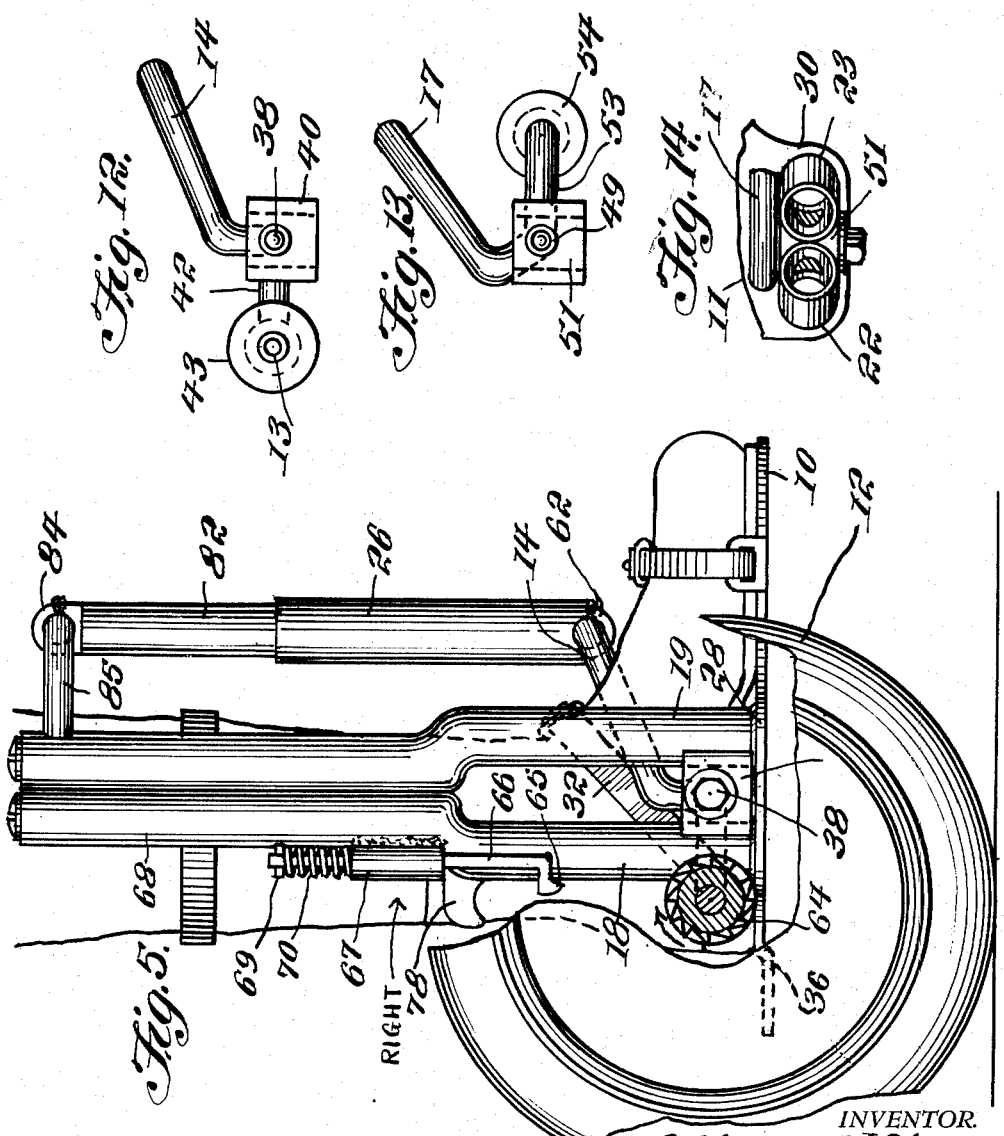

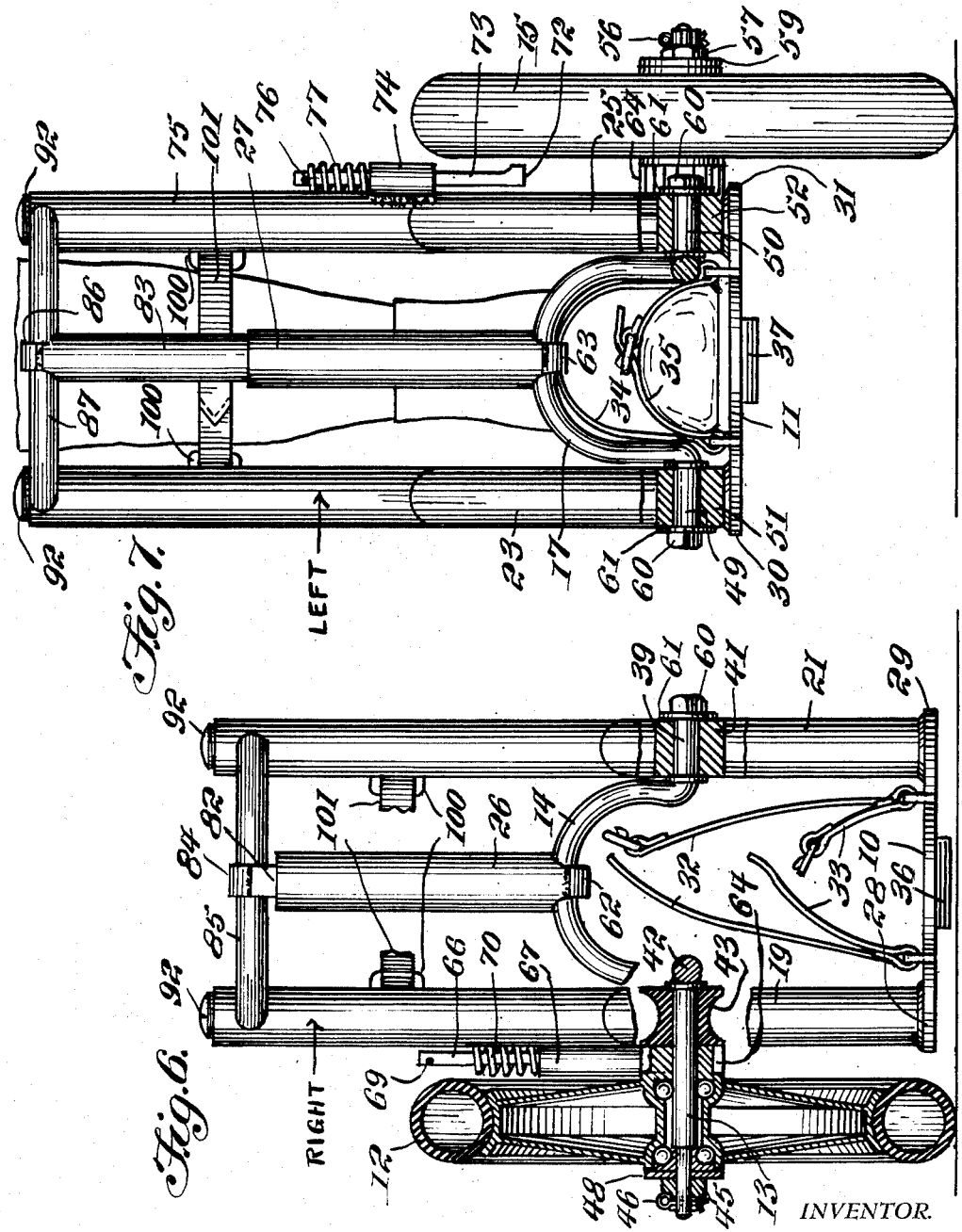

April 13, 1954     M. J. KING     2,675,243
MONOWHEEL ROLLER SKATE
Filed Aug. 20, 1951     5 Sheets-Sheet 5
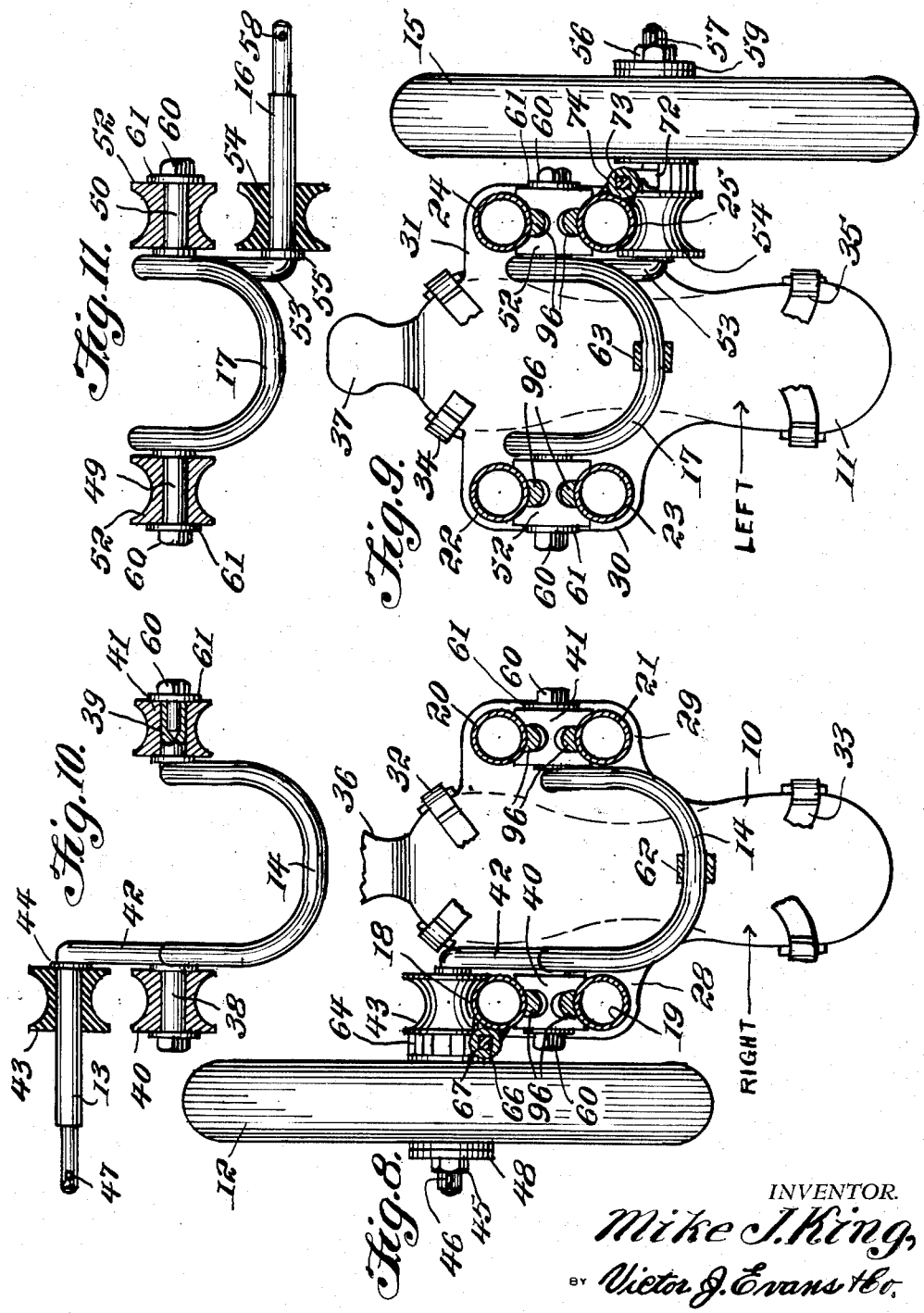
INVENTOR.
Mike J. King,
BY Victor J. Evans & Co.
ATTORNEYS Patented Apr. 13, 1954

2,675,243

UNITED STATES PATENT OFFICE 2,675,243

MONOWHEEL ROLLER SKATE

Mike J. King, Danville, Ill.

Application August 20, 1951, Serial No. 242,641

10 Claims. (Cl. 280—11.24)

This invention relates to roller skates of the type using a single wheel on each foot, and in particular a wheel mounting wherein a wheel is journalled on one side of a foot pedal and provided with springs for urging the wheel downwardly as the foot is raised, and a shock absorber for retarding the return of the pedal to the downwardly disposed position when the weight of the body is placed thereon.

The purpose of this invention is to provide an improved roller skate wherein one wheel only is used on each foot and the wheel remains on the ground continuously with resilient means for urging the wheel downwardly as the foot is raised and hydraulic means for retarding downward movement of the foot as the weight of the body is returned to the wheel, whereby high speed skating, such as is particularly desirable in racing, is possible.

Various devices have been provided for increasing the size of rollers or wheels on roller skates for increasing the speed of travel and also for combining the action of a bicycle with roller skates, however it is difficult to combine an automatic raising and lowering action of a wheel in relation to a foot pedal without increasing the weight of the skate to such an extent that use thereof is objectionable. With this thought in mind this invention contemplates a pedal having a wheel journalled on one side, mounted on a comparatively light weight frame with an axle in the form of a crank shaft and with the wheel urged to a downwardly disposed position by compression springs, and wherein upward movement of the wheel is retarded by a hydraulic cylinder or shock absorber.

With this device strapped to the shoe of a skater it is operated with a conventional skating action with forward movement by first the right foot and then the left and with reverse movement at slow speed checked with a ratchet and pawl.

The object of this invention is, therefore, to provide means for constructing a roller skate whereby wheels, eccentrically journalled on a pedal, and urged downwardly by springs and the upward movements of which are controlled by shock absorbers are mounted on the feet of a skater.

Another object of the invention is to provide a mono-wheel skate in which means is provided for preventing the wheels of the skates rolling backwardly.

Another object of the invention is to provide an improved single wheel roller skate in which a stop is provided for limiting downward movement of the wheel.

A further object of the invention is to provide an improved roller skate in which the foot of a skater is attached to the wheels through an eccentric section of a crank shaft and wherein as speed of the skater continues to increase the feet remain at a comparatively high elevation.

A still further object of the invention is to provide an improved mono-skate wheel which is of a comparatively simple and economical construction.

With these and other objects and advantages in view the invention embodies a pedal having means for strapping the shoe of a skater thereon, a shaft having an eccentric section therein journalled on the pedal, a wheel journalled on one end of the shaft, a supporting frame in which the pedal is mounted, springs in the frame positioned to urge the pedal downwardly, a shock absorber also carried by the frame and positioned to retard upward movement of the wheel in relation to the pedal, and a ratchet for preventing the wheel rotating in reverse.

Other features and advantages of the invention will appear from the following description taken in connection with the drawings wherein:

Figure 1 is a side elevational view illustrating the improved skate mounted on a foot with the foot in the downwardly extended position and with the spring and hydraulic cylinders shown in section.

Figure 2 is a similar view showing the position of the parts with the foot elevated and with the wheel urged downwardly by springs.

Figure 3 is a detail showing an elevational view of the lower parts of the spring cylinders with a stop extended from one side for limiting upward movement of the wheel.

Figure 4 is a side elevational view similar to that shown in Fig. 1 illustrating the position of the skate on the right foot of a skater and also in which parts are broken away and shown in section.

Figure 5 is a similar view also illustrating the skate on the right foot with the foot elevated and with the wheels moved downwardly to the lower position, the parts being shown in elevation with part of the wheel broken away.

Figure 6 is a front elevational view of the skate with the parts in the position shown in Fig. 4 wherein the right foot pedal is in the lower position, and in this view parts are shown in elevation and other parts in section.

Figure 7 is a front elevational view illustrating the skate on the left foot and with the parts in the position as shown in Fig. 2 and also in which parts are broken away and shown in section.

Figure 8 is a sectional plan through the lower part of the skate with the shock absorber omitted and illustrating the skate mounted on the right foot of the skater wherein the wheel is positioned toward the rear of the center line of the body of the skater.

Figure 9 is a similar sectional plan showing the left foot wherein the wheel is positioned toward the forward side of the center line of the skater.

Figure 10 is a detail showing the eccentric shaft of the skate illustrated in Fig. 8 with the slides and rollers in combination therewith and with other parts omitted.

Figure 11 is a similar view showing the shaft illustrated in Fig. 9.

Figure 12 is an end elevational view showing the crank shaft of the skate for the right foot as illustrated in Figs. 4 and 5 and showing the shaft pivotally mounted on a slider with other parts omitted.

Figure 13 is a similar end elevational view of the shaft for the skate of the left foot as illustrated in Figs. 1, 2, 9 and 11.

Figure 14 is a sectional plan through the upper parts of the spring and cylinders illustrating a position of the shaft carrying slider between the lower ends of the spring casings.

Figure 15 is a detail illustrating a rubber roller which provides a stop on the end of the crank or eccentric shaft.

Figure 16 is a detail showing a section through the spring cylinders illustrating a strap extended through an eye carried by the cylinders.

Figure 17 is a detail showing a section through the lower part of the upper section of the hydraulic cylinder or shock absorber illustrating the bleeder opening in the hinged closure on the lower end of the upper section of the cylinder.

Figure 18 is a cross section taken on line 18—18 of Fig. 17 also showing the hinged closure carried by the lower end of the upper section of the hydraulic cylinder or shock absorber.

Referring now to the drawings wherein like reference characters denote corresponding parts the improved mono-skate wheel of this invention includes a pedal 10 for the right foot, a similar pedal 11 for the left foot, a wheel 12 journaled on a spindle 13 of a shaft 14 for the right foot, a similar wheel 15 journaled on a spindle 16 of a shaft 17 for the left foot, spring cylinders having lower sections 18 and 19 on one side of the pedal 10 for the right foot and 20 and 21 on the opposite side, spring cylinders having similar lower sections 22 and 23 on one side of the pedal of the left foot and similar cylinders 24 and 25 on the opposite side, a shock absorber having a lower section 26 for the right foot and a similar shock absorber having a lower section 27 for the left foot.

The pedal 10 is provided with extensions 28 and 29 at the sides in which the lower ends of the lower sections of the spring cylinders are mounted and the pedal 11 is provided with similar extensions 30 and 31 on which the lower ends of the lower sections of the spring cylinders for the left foot are mounted.

The pedal 10 is provided with a heel strap 32 and a toe strap 33 and the pedal 11 is provided with a similar heel strap 34 and a toe strap 35. The pedal 10 is also provided with a beaver tail extension 36 at the rear and a similar extension 37 is provided at the rear of the pedal 11 to cause skidding or a scraping action which will bring the wearer to a stop.

The shaft 14, which is substantially U-shaped in plan, as illustrated in Fig. 10, is provided with pins 38 and 39 by which the shaft is journalled in sliders 40 and 41, respectively and with the sliders free to travel upwardly and downwardly between the lower sections of the spring cylinders, the shaft is free to travel vertically in the frame. The spindle 13 on which the wheel 12 is journalled is mounted on the shaft 14 through an extension 42 and a rubber roller 43 is provided between the wheel and a flange 44 on the inner end of the spindle. The wheel is retained on the spindle by a nut 45 with a cotter pin 46 extended through an opening 47 in the outer end of the spindle and with a washer 48 between the nut and wheel.

The shaft 17 of the pedal 11, for the left foot, is provided with similar pins 49 and 50 by which the shaft is journalled in sliders 51 and 52, respectively and with the sliders free to travel between the lower sections 22 and 23 on one side and 24 and 25 on the other of the spring cylinders the shaft is free to travel vertically. The spindle 16 on which the wheel 15 is mounted extends from an extension 53 of the shaft 17 and a rubber roller 54 is positioned between the wheel 15 and a collar 55. The wheel 15 is retained on the spindle by a nut 56 with the nut held by a cotter pin 57 which extends through an opening 58 in the extended end of the spindle and a washer 59 is positioned between the nut and wheel.

The pins of the shafts 14 and 17 are retained in the sliders by a cap screw 60 with washers 61 between the heads of the cap screws and surfaces of the sliders.

The lower end of the outer sleeve or tubular lower section 26 of the shock absorber of the right foot is provided with an eye 62 by which the shock absorber is pivotally mounted on the intermediate section of the shaft 14, as illustrated in Fig. 6, and the lower section 27 of the shock absorber for the left foot is provided with a similar eye 63 by which it is pivotally mounted on the U-shaped section 17 as shown in Fig. 7.

The hub of the wheel 12 is provided with a ratchet wheel 64 that is positioned to be engaged by a pawl 65 on the lower end of a square rod 66 that is slidably mounted in a bearing 67 on one side of the upper spring cylinder 68, which extends from the lower section 18, and the upper end of the rod 66 is provided with a pin 69 that rests upon the upper end of a spring 70 when the wheel 12 moves downwardly in relation to the pedal whereby the pawl 65 is retained in a free position above the ratchet wheel 64.

A similar ratchet wheel 71 is provided on the hub of the wheel 15 and a pawl 72 on the lower end of a square rod 73 which is slidably mounted in a bearing 74 is positioned to engage the ratchet wheel upon downward movement of the pedal 11 whereby the pawl 72 is in mesh with the teeth of the ratchet wheel. The sleeve 74 is mounted on a spring cylinder 75 that extends upwardly from the lower section 25 and a pin 76 through the upper end of the rod 73 rests upon a spring 77 positioned around the rod, as shown in Fig. 7.

The lower section 18 of the upper spring cylinder 68 is provided with a finger 78 which is formed with an arcuate lower surface 79 and this finger is positioned whereby the surface 79 engages the rubber roller 43 on the spindle 13 of the shaft 14 of the right foot to limit downward movement of the pedal 10.

A similar finger 80 having an arcuate lower surface 81 on the lower section 25 of the upper spring cylinder 75 provides a stop for the pedal 11 of the left hand skate, the finger being positioned whereby the surface 81 engages the rubber roller 59 of the spindle 16 of the shaft 17.

The shock absorbers formed with the lower sections 26 and 27 are provided with upper telescoping sleeves 82 and 83, the sleeve 82 being provided with an eye 84 by which it is mounted on the spring cylinders through an arcuate arm 85, and the sleeve 83 being provided with an eye 86 through which the shock absorber is mounted on the spring cylinders through an arm 87.

The lower ends of the sleeves 82 and 83 are provided with closure plates 88 which are hinged by pins 89 to the lower ends of the sleeves and the closure plates are provided with orifices 90 and stop fingers 91, the fingers limiting opening movements of the closure plates and the orifices 90 retarding the flow of fluid from the lower sections of the shock absorbers to the upper sections thereof. By this means the lower sections 26 and 27 are free to move downwardly, and upward travel thereof is restricted by the flow of fluid through the orifices 90.

Each of the spring cylinders is provided with an elongated threaded substantially hollow sleeve 92 with a screw driver slot 93 in the outer end whereby the tension on a spring 94 may readily be adjusted and, as illustrated in Figs. 1 and 2 the springs are positioned to extend into the sleeves or nuts 92 with the lower ends bearing against pistons 95 on rods 96, the lower ends 97 of which extend through openings 98 in offset sections 99 of the spring cylinders or tubes and the ends 97 are secured to the ends of the sliders 40, 41, 51 and 52, also as shown in Figs. 1 and 2.

The upper parts of the spring cylinders are provided with eyes 100 through which leg straps 101 pass and the eyes are secured to the cylinders by plates 102, as shown in Fig. 16.

With the parts arranged in this manner the springs urge the wheel mounting elements downwardly with the closure 88 which provides the larger opening dropping to permit the fluid to pass rapidly downwardly to the lower section of the shock absorber. The orifice 90 being the smaller opening, will retard the upward movement, and with the added weight of the wearer these openings will just about equalize the time element of both up and down movements. As the weight of the foot is again placed on the platform the closure 88 closes whereby it is necessary for the fluid to pass back through the orifice 90 so that the upward movement of the wheel is retarded and this action coacts with the springs which are being compressed at the same time.

*Operation*

To use the mono-wheel skate a skater stands erect with each foot strapped in one of the frames or to the pedals and at this point the pedals are substantially ⅝ of an inch above the level of the ground and the toe part of the foot is tipped forwardly to maintain balance.

The operation starts in the same manner as skating with conventional roller skates, the right foot being raised and moved forwardly, in which movement the combined weight of the wheel, axle, and sliders in addition to the downward force resulting from the spring units urges the wheel downwardly whereby the wheel rolls continuously without traveling upwardly with the movement of the foot.

The limit to the down travel of the wheel is substantially 3½ inches.

This action continues with the fluid in the shock absorber of the right foot traveling downwardly with the lower section of the shock absorber and as the weight is again applied to the right foot, the left foot being raised, the same action takes place with the left foot with the downward movement of the right foot being retarded by the combined reaction of the springs and the fluid passing upwardly into the upper part of the shock absorber through the orifice 90.

As the skating action continues the weight of the body is transferred first from one foot to the other and with each movement the action of the shock absorber is reversed.

With continued travel the movement becomes less and at high speed both feet remain substantially in the upper positions as illustrated in Figs. 2 and 5.

Upon slowing down of the forward motion the wheels are prevented from moving rearwardly by the pawl and ratchet and the downward movement of the feet is arrested by the fingers 78 and 80.

Balance may be maintained by tipping backward to rest weight upon extreme end of "Beaver tail skid," the same as tipping forward upon toe edge of foot rest or pedal provides balancing means.

In this skate the engagement of the pawls 65 and 72 with the ratchet wheels 64 and 71 respectively is fully automatic, with the parts engaging as the foot pedals 10 and 11 approach the ground. The disengagement of the pawls with the ratchet wheels is also automatic with the pawls leaving the wheels as the wearer's foot is raised.

The beaver tail skids 36 and 37 are used primarily for a brake or as stopping skids when slowing down. The skids can also be used as steadying rests when standing still.

It will be understood that modifications may be made in the design and arrangement of the parts without departing from the spirit of the invention.

What is claimed is:

1. A roller skate comprising a foot pedal, a pair of vertically disposed spring cylinders mounted on said pedal springs in said cylinders, a crank shaft, means slidably and pivotally mounting the crank shaft on said cylinders, means whereby force of the springs in the spring cylinders is applied to the crank shaft for urging the crank shaft downwardly, a wheel journalled on the crank shaft, and a shock absorber connected to the spring cylinders and crank shaft for retarding downward movement of the pedal.

2. A roller skate comprising a foot pedal, a pair of vertically disposed spring cylinders positioned on each side of said pedal springs in said cylinders, a crank shaft, means slidably and pivotally mounting the crank shaft on said cylinders, means whereby force of the springs in the cylinders is applied to the crank shaft for urging the crank shaft downwardly, a wheel journalled on the crank shaft, and a shock absorber connected to the spring cylinders and crank shaft for retarding downward movement of the pedal.

3. A roller skate comprising a foot pedal, a pair of vertically disposed spring cylinders, the lower ends of which are in spaced relation, mounted on each side of said pedal springs in said cylinders, sliders mounted for vertical travel and positioned between the lower spaced ends of the spring cylinders, means applying the force of the springs to the sliders, a crank shaft journalled in the sliders and having an eccentrically positioned U-shaped section therein, a hydraulic cylinder extended between the said U-shaped section of the crank shaft and upper ends of the spring cylinders, a closure having a bleeder opening therein positioned in the hydraulic cylinders for retarding downward movement of the pedal, and a wheel journalled on said crank shaft.

4. A roller skate as described in claim 3 wherein fingers extended from the spring cylinders are positioned to engage rubber rollers on the crank shaft for limiting downward movement of the pedal in relation to the wheel.

5. A roller skate as described in claim 3 wherein toe and heel straps are provided on the pedal and in which a leg strap is provided on the spring cylinders.

6. A roller skate as described in claim 3 wherein a ratchet is provided for preventing the wheel rotating in reverse, a stop is provided for limiting downward movement of the pedal, and a beaver tail skid extends from the rear end of the pedal.

7. In a roller skate as described in claim 3, a ratchet wheel carried by one of said sliders, and a pawl carried by the spring cylinders between the lower ends of which the slider having the ratchet wheel thereon is positioned, whereby engagement of and disengagement with the pawl and the ratchet wheel is automatic with the upward and downward movement of the foot of a wearer of the skate.

8. In a roller skate as described in claim 3, a beaver tail skid extended from the rear end of the foot pedal for providing a brake to slow down and stop the skate, said beaver tail skid also providing a steadying rest with the skate idle.

9. A roller skate comprising a foot pedal, a pair of vertically disposed spring cylinders, the lower ends of which are spaced in spaced relation, mounted on each side of said pedal, springs in said cylinder, sliders mounted for vertical travel and positioned between the lower spaced ends of the spring cylinders, means applying the force of the springs to the sliders, a crank shaft journalled in the sliders and having an eccentrically positioned U-shaped section therein, a hydraulic cylinder extended between the said U-shaped section of the crank shaft and upper ends of the spring cylinders, a closure having a bleeder opening therein positioned in the hydraulic cylinders for retarding downward movement of the pedal, a wheel having a hub with a ratchet wheel therein journaled on said crank shaft, and a spring actuated pawl carried by one of the spring cylinders and positioned to coact with the ratchet wheel for preventing the wheel rotating rearwardly.

10. A roller skate comprising a foot pedal, a pair of vertically disposed spring cylinders, the lower ends of which are in spaced relation, mounted on each side of said pedal springs in said cylinders, sliders mounted for vertical travel and positioned between the lower spaced ends of the spring cylinders, means applying the force of the springs to the sliders, a crank shaft journaled in the sliders and having an eccentrically positioned U-shaped section therein, rubber rollers mounted on said crank shaft, fingers extended from some of the cylinders and positioned to engage the rubber rollers to provide a limiting downward movement of the pedal, a hydraulic cylinder extended between the said U-shaped section of the crank shaft and upper ends of the spring cylinders, a closure having a bleeder opening therein positioned in the hydraulic cylinders for retarding downward movement of the pedal, and a wheel journaled in said crank shaft.

References Cited in the file of this patent

UNITED STATES PATENTS

| Number | Name | Date |
|---|---|---|
| 504,226 | Leedham | Aug. 26, 1893 |
| 2,342,381 | Thornhill | Feb. 22, 1944 |
| 2,467,478 | Hollingsworth | Apr. 19, 1949 |
| 2,526,711 | Thomas | Oct. 24, 1950 |

FOREIGN PATENTS

| Number | Country | Date |
|---|---|---|
| 144,056 | Austria | Dec. 27, 1935 |
| 205,056 | Great Britain | 1925 |